United States Patent
Park et al.

(10) Patent No.: US 11,073,840 B2
(45) Date of Patent: Jul. 27, 2021

(54) APPARATUS FOR CONTROLLING VEHICLE PLATOONING AND METHOD THEREOF

(71) Applicants: Hyundai Motor Company, Seoul (KR); Kia Motors Corporation, Seoul (KR); Korea University Research and Business Foundation, Seoul (KR)

(72) Inventors: Hong Gi Park, Seoul (KR); Hyoung Jong Wi, Seoul (KR); Dae Hie Hong, Seoul (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 244 days.

(21) Appl. No.: 16/393,384

(22) Filed: Apr. 24, 2019

(65) Prior Publication Data
US 2020/0159250 A1 May 21, 2020

(30) Foreign Application Priority Data
Nov. 15, 2018 (KR) .......................... 10-2018-0140868

(51) Int. Cl.
 *G05D 1/02* (2020.01)
 *G08G 1/00* (2006.01)
(52) U.S. Cl.
 CPC .......... *G05D 1/0295* (2013.01); *G05D 1/0223* (2013.01); *G05D 1/0257* (2013.01); *G08G 1/22* (2013.01); *G05D 2201/0213* (2013.01)
(58) Field of Classification Search
 CPC .......... G05D 1/0223–0295; G05D 2201/0213; G08G 1/22
 See application file for complete search history.

(56) References Cited

U.S. PATENT DOCUMENTS

| 8,744,666 | B2 * | 6/2014 | Switkes ............... G08G 1/166 |
| | | | 701/28 |
| 8,948,995 | B2 * | 2/2015 | Pandita ............... B60W 30/17 |
| | | | 701/96 |
| 9,632,507 | B1 * | 4/2017 | Korn .................... G05D 1/0295 |
| 9,927,816 | B2 * | 3/2018 | Li ....................... G05D 1/0027 |

(Continued)

FOREIGN PATENT DOCUMENTS

KR 20180023100 A 3/2018

OTHER PUBLICATIONS

DE 102016011325.1 (German with Machine Translation into English), published in 2018, all pages, retrieved from https://patentscope.wipo.int/search/en/detail.jsf;jsessionid= EDA88E58DD9AC24AF4493523E25829C4.wapp1nA?docId= DE213756350&tab=NATIONALBIBLIO (Year: 2018).*

*Primary Examiner* — Calvin Cheung
(74) *Attorney, Agent, or Firm* — Slater Matsil, LLP (57) ABSTRACT

Disclosed are an apparatus for controlling vehicle platooning and a method thereof. The apparatus includes a communication device that receives estimated acceleration from a leading vehicle, a radar sensor that measures acceleration of a preceding vehicle, and a controller that calculates corrected acceleration by using the estimated acceleration received from the leading vehicle and the acceleration (hereinafter, referred to as a measured acceleration) of the preceding vehicle measured by the radar sensor and controls the vehicle platooning based on the corrected acceleration.

20 Claims, 11 Drawing Sheets

(56) References Cited

U.S. PATENT DOCUMENTS

| | | | | |
|---|---|---|---|---|
| 10,429,504 | B2* | 10/2019 | Choi | G01S 7/003 |
| 2010/0256852 | A1* | 10/2010 | Mudalige | G08G 1/22 |
| | | | | 701/24 |
| 2011/0093177 | A1* | 4/2011 | Horn | B60W 30/16 |
| | | | | 701/70 |
| 2013/0124064 | A1* | 5/2013 | Nemoto | B60W 30/16 |
| | | | | 701/96 |
| 2013/0261948 | A1* | 10/2013 | Funabashi | G01S 13/931 |
| | | | | 701/300 |
| 2014/0005906 | A1* | 1/2014 | Pandita | B60W 40/04 |
| | | | | 701/96 |
| 2017/0287233 | A1* | 10/2017 | Nix | G08G 1/166 |
| 2018/0050673 | A1* | 2/2018 | D'sa | B60T 7/22 |
| 2018/0120861 | A1* | 5/2018 | Saxena | G05D 1/0291 |
| 2018/0137763 | A1* | 5/2018 | Derag Rden | B60W 10/10 |
| 2018/0188725 | A1* | 7/2018 | Cremona | G01S 19/13 |
| 2018/0188746 | A1* | 7/2018 | Lesher | G05D 1/0287 |
| 2019/0079538 | A1* | 3/2019 | Switkes | B60W 50/14 |
| 2019/0168754 | A1* | 6/2019 | Makled | B60W 30/143 |
| 2019/0232962 | A1* | 8/2019 | Broll | B60W 30/16 |
| 2019/0245647 | A1* | 8/2019 | Alieiev | H04W 4/46 |
| 2020/0082727 | A1* | 3/2020 | Zhao | G08G 1/096791 |
| 2020/0388164 | A1* | 12/2020 | Domprobst | G08G 1/22 |
| 2020/0410868 | A1* | 12/2020 | Bouillon | G05D 1/0293 |

\* cited by examiner

APPARATUS FOR CONTROLLING VEHICLE PLATOONING AND METHOD THEREOF

CROSS-REFERENCE TO RELATED APPLICATIONS

This application claims priority to Korean Patent Application No. 10-2018-0140868, filed in the Korean Intellectual Property Office on Nov. 15, 2018, which application is hereby incorporated herein by reference.

TECHNICAL FIELD

The present disclosure relates to an apparatus for controlling vehicle platooning and a method thereof.

BACKGROUND

Generally, in a situation where a plurality of vehicles travel to one destination at the same time, when most drivers do not know the road to the destination and one driver knows the road, there is a person who knows a shortcut through a branch road and the like and it is desired to move through a specific route among a plurality of routes to a destination, the vehicles move to a good place without a specific destination, and the vehicles pass through an unsettled route such as a resting place while moving to a destination, vehicle platooning is performed.

Such platooning allows several vehicles to move together while maintaining a minimum safety distance. When vehicles are driven in a platoon, the air resistance of the following vehicle may be reduced to improve fuel economy, the risk of accidents may be reduced, the convenience for each vehicle driver may be improved, and the number of vehicles using the road may be increased by 3 to 5 times because the interval between vehicles is reduced.

In recent years, a technique has been developed that allows a driver to ride only in the leading vehicle and enables following vehicles to travel in a platoon without any drivers boarding the following vehicles.

Generally, each vehicle following the leading vehicle measures the acceleration of a preceding vehicle in front of the vehicle by using a radar sensor, and then maintains the inter-vehicle distance based on the measured acceleration. However, since the measured acceleration is a factor in which the time taken from when the driver of the head vehicle depresses the accelerator pedal or the brake pedal to when the actual actuator is actually driven (e.g., a transport delay, a sampling time, an actuator response time, an engine delay, a brake delay, and the like) is not reflected, the following vehicles may not be driven quickly and stably in a platoon. That is, since the following vehicle follows the preceding vehicle on the basis of the measured acceleration in which the above-mentioned time delay is not reflected, the fluctuation range of the distance from the preceding vehicle is increased, so that it is difficult to stably perform the platooning.

Since the conventional platooning control technique controls the vehicle platooning based on the measured acceleration, it is difficult to minimize the fluctuation range of the distance between the vehicles, so that the stability of the platooning cannot be guaranteed. In addition, due to the large fluctuation range of the inter-vehicle distance, the fuel efficiency of a vehicle is deteriorated.

SUMMARY

Embodiments disclosed herein can solve problems occurring in the prior art while advantages achieved by the prior art are maintained intact.

An aspect of the present disclosure provides an apparatus for controlling vehicle platooning, which is capable of minimizing the fluctuation range of the inter-vehicle distance and improving the fuel efficiency of a following vehicle by correcting acceleration (hereinafter, referred to as measurement acceleration) of a leading vehicle measured by a following vehicle based on acceleration (hereinafter, referred to as estimation acceleration) of the leading vehicle estimated by using an accelerator position sensor (APS) value and a brake position sensor (BPS) value of the leading vehicle, and by controlling the platooning of the following vehicle by using corrected acceleration (hereinafter, referred to as correction acceleration), and a method thereof.

The technical problems that can be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling vehicle platooning includes a communication device that receives estimated acceleration from a leading vehicle. A radar sensor measures acceleration of a preceding vehicle, and a controller calculates corrected acceleration by using the estimated acceleration received from the leading vehicle and the acceleration (hereinafter, referred to as a measured acceleration) of the preceding vehicle measured by the radar sensor and controls the vehicle platooning based on the corrected acceleration.

The controller may give weights to the estimated acceleration and the measured acceleration, respectively to calculate the corrected acceleration. The controller may divide a sum of a result of multiplying the estimated acceleration by an estimated weight and a result of multiplying the measured acceleration by a measured weight by a sum of the estimated weight and the measured weight, thereby calculating the corrected acceleration.

The controller may give a greater weight to the measured acceleration than the estimated acceleration when an error of an inter-vehicle distance is included in a first section. The controller may give a same weight to the estimated acceleration and the measured acceleration when an error of an inter-vehicle distance is included in a second section. The controller may give a greater weight to the estimated acceleration than the measured acceleration when an error of an inter-vehicle distance is included in a third section.

The estimated acceleration may be estimated based on an engine torque corresponding to an accelerator position sensor (APS) value and an engine revolution per minute (RPM).

The estimated acceleration may be estimated based on an engine torque corresponding to an accelerator position sensor (APS) value and an engine revolution per minute (RPM) and a torque applied to a wheel by a hydraulic pressure corresponding to a brake position sensor (BPS) value.

According to another aspect of the present disclosure, a method of controlling vehicle platooning includes receiving, by a communication device, estimated acceleration from a leading vehicle. A radar sensor measures acceleration of a preceding vehicle and a controller calculates corrected acceleration by using the estimated acceleration received and the measured acceleration (hereinafter, referred to as a measured acceleration) of the preceding vehicle. The controller also controls the vehicle platooning based on the corrected acceleration calculated.

The calculating of the corrected acceleration may include giving weights to the estimated acceleration and the measured acceleration, respectively to calculate the corrected acceleration. The calculating of the corrected acceleration may include dividing a sum of a result of multiplying the estimated acceleration by an estimated weight and a result of multiplying the measured acceleration by a measured weight by a sum of the estimated weight and the measured weight, thereby calculating the corrected acceleration. The calculating of the corrected acceleration may include giving a greater weight to the measured acceleration than the estimated acceleration when an error of an inter-vehicle distance is included in a first section.

The calculating of the corrected acceleration may include giving a same weight to the estimated acceleration and the measured acceleration when an error of an inter-vehicle distance is included in a second section. The calculating of the corrected acceleration may include giving a greater weight to the estimated acceleration than the measured acceleration when an error of an inter-vehicle distance is included in a third section.

The estimated acceleration may be estimated based on an engine torque corresponding to an accelerator position sensor (APS) value and an engine revolution per minute (RPM).

The estimated acceleration may be estimated based on an engine torque corresponding to an accelerator position sensor (APS) value and an engine revolution per minute (RPM) and a torque applied to a wheel by a hydraulic pressure corresponding to a brake position sensor (BPS) value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the present disclosure, a leading vehicle refers to a vehicle that travels the most ahead in a platoon, a following vehicle refers to a vehicle that follows the leading vehicle, and a preceding vehicle refers to a vehicle that is positioned ahead of the host vehicle. For example, when the vehicle 1, vehicle 2 and vehicle 3 travel sequentially in a platoon, the vehicle 1 becomes the leading vehicle, and the vehicle 2 and the vehicle 3 become the following vehicles. In this case, the preceding vehicle is the leading vehicle in the position of the vehicle 2, and the preceding vehicle is the vehicle 2 in the position of the vehicle 3.

Figure 1:
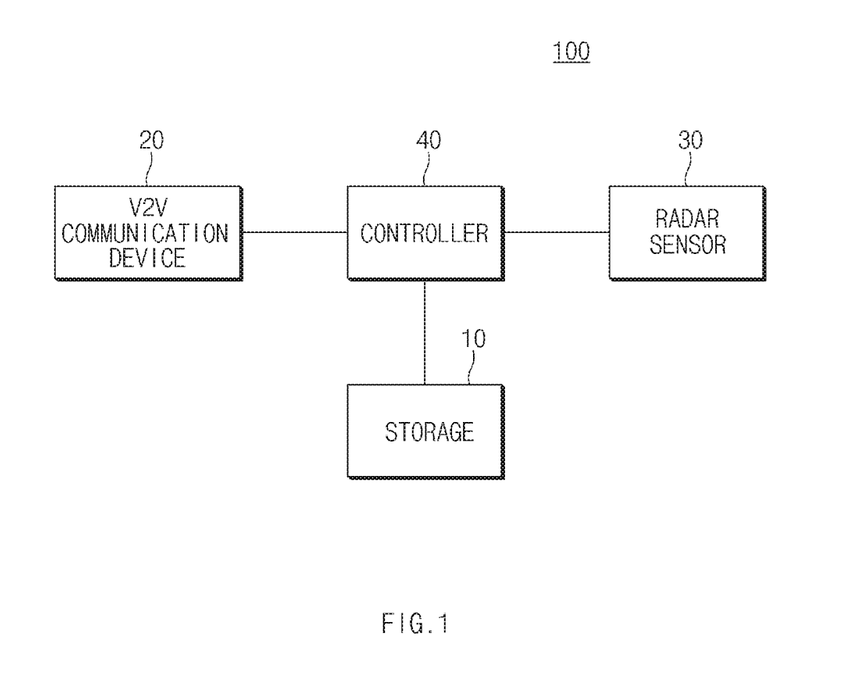
FIG. 1 is a block diagram illustrating an apparatus for controlling vehicle platooning according to an embodiment of the present disclosure.

FIG. 1 is a block diagram illustrating an apparatus for controlling vehicle platooning according to an embodiment of the present disclosure.

As illustrated in FIG. 1, an apparatus 100 for controlling vehicle platooning according to an embodiment of the present disclosure may include storage 10, a vehicle-to-vehicle (V2V) communication device 20, a radar sensor 30, and a controller 40. Meanwhile, according to a scheme of implementing the apparatus for controlling vehicle platooning according to an embodiment of the present disclosure, components may be coupled to each other so that the components are implemented as one. In addition, some components may be omitted according to a scheme of implementing an embodiment.

Referring to each component, first, the storage 10 may store a logic, an algorithm and a program required in an operation of correcting acceleration (hereinafter, referred to as measured acceleration) of a leading vehicle measured by a following vehicle based on acceleration (hereinafter, referred to as estimated acceleration) of the leading vehicle estimated by using an accelerator position sensor (APS) value and a brake positon sensor (BPS) value of the leading vehicle and controlling platooning of following vehicles by using the corrected acceleration (hereinafter, correction acceleration).

In addition, the storage 10 may store section information of an inter-vehicle distance which is a reference for giving a weight to the estimated acceleration and the measured acceleration in the process of correcting the measured acceleration by using the estimated acceleration.

In addition, the storage 10 may store weighted information of the estimated acceleration and weighted information of the measured acceleration that are set for each section of the inter-vehicle distance.

In addition, The storage 10 may include a storage medium having at least one type of a flash memory type, a hard disk type, a micro type, a card type of a memory (for example, an SD, XD memory, or the like), RAM (Random Access Memory), SRAM (Static RAM), ROM (Read-Only Memory), EEPROM (Electrically Erasable Programmable Read-Only Memory), PROM (Programmable Read-Only Memory), MRAM (Magnetic RAM), a magnetic disc, and an optical disc.

Next, the V2V communication device 20, which is a module for providing an interface for vehicle-to-vehicle communication, may transmit and receive various information via communication with vehicles traveling in a platoon. In particular, when the V2V communication device 20 is mounted on a following vehicle, the V2V communication device 20 may receive the estimated acceleration from the leading vehicle. In this case, the estimated acceleration means the acceleration of the leading vehicle estimated by the apparatus for controlling vehicle platooning mounted on the leading vehicle.

Figure 2:
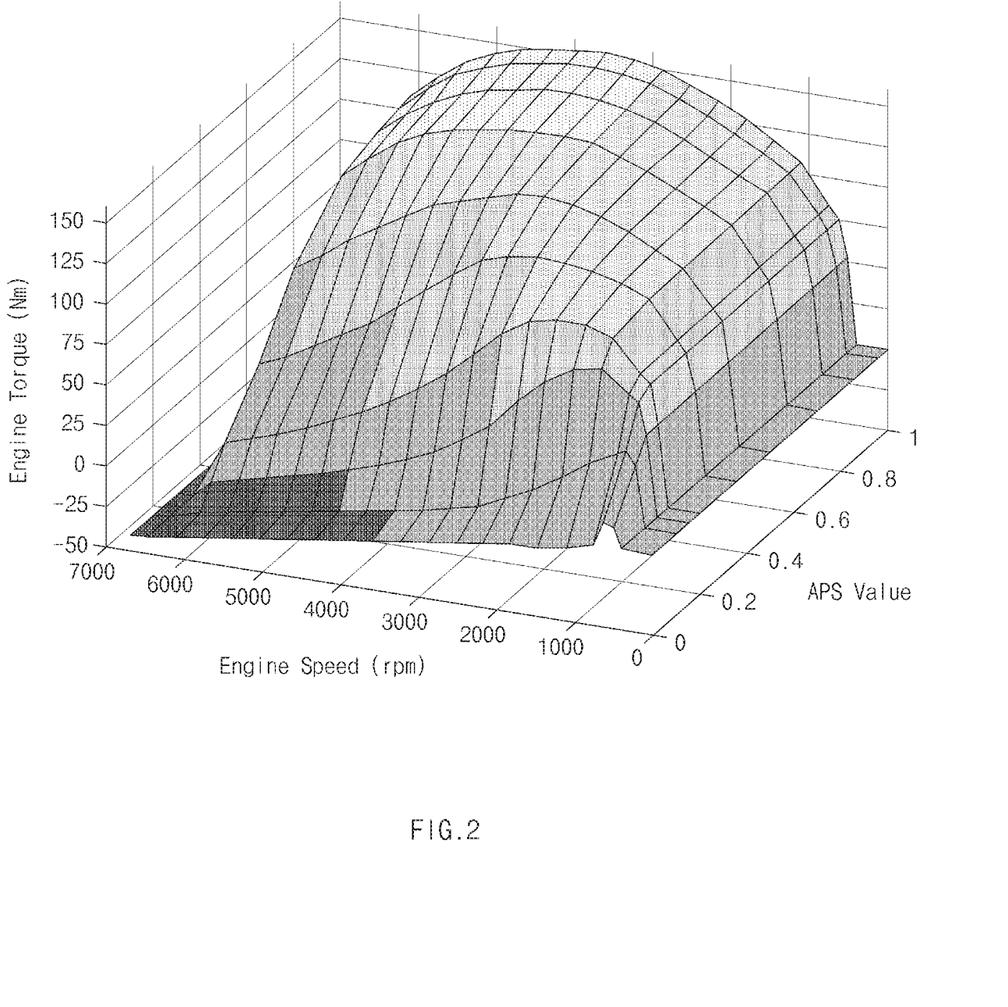
FIG. 2 is a view illustrating a map in which an engine torque corresponding to an APS value and an engine RPM is recorded according to an embodiment of the present disclosure.

Hereinafter, the process of estimating the acceleration of the leading vehicle by the apparatus for controlling vehicle platooning mounted on the leading vehicle will be described with reference to FIGS. 2 to 4.

First, the apparatus for controlling vehicle platooning mounted on the leading vehicle may further include a map in which an APS value and a torque of an engine corresponding to a revolution per minute (RPM) of the engine are recorded. Such a map is shown in FIG. 2 as an example. In this case, the APS value is a value indicating the degree of depression of an accelerator pedal, and may be expressed as a percentage (%) or an angle(°).

Figure 3:
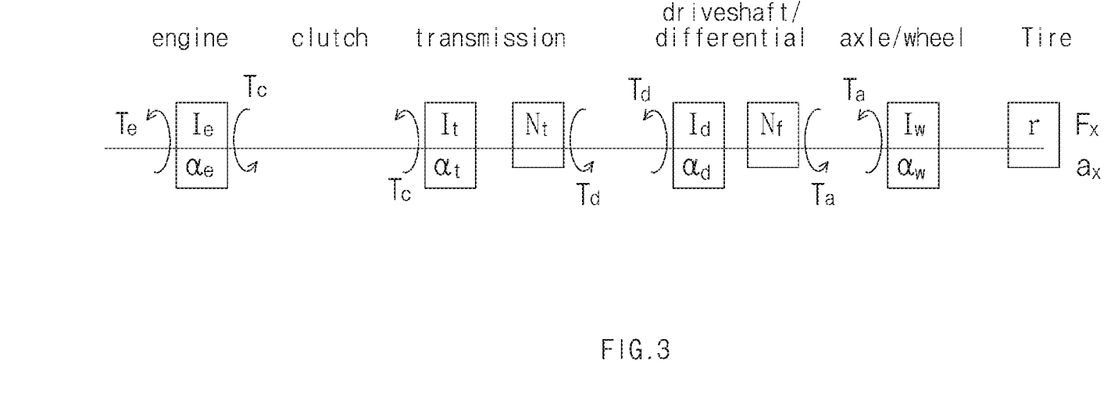
FIG. 3 is a view illustrating power transmission from an engine to a wheel used to derive a traction force according to an embodiment of the present disclosure.

Generally, the power transmission process from the engine to the wheels can be represented as shown in FIG. 3.

In FIG. 3, the torque generated by the engine is transmitted to a clutch. The torque transmitted to the clutch may be expressed as following equation 1.

$$T_c = T_e - I_e \alpha_e \quad \text{[Equation 1]}$$

where Tc denotes a torque of the clutch, Te denotes a torque of the engine, Ie denotes an engine rotational inertia, and $\alpha_e$ denotes engine rotational acceleration.

The torque of the clutch is transmitted to a drive shaft through a transmission. The torque transmitted to the drive shaft may be expressed as following equation 2.

$$T_d = (T_c - I_t \alpha_t) \times N_t \quad \text{[Equation 2]}$$

where Td denotes a torque of the drive shaft, It denotes a transmission rotational inertia, $\alpha_t$ denotes transmission rotational acceleration, and Nt denotes a numerical ratio of the transmission.

The torque of the drive shaft is transmitted to the wheels. The torque transmitted to the wheels may be expressed as following equation 3.

$$T_a = (T_d - I_d \alpha_d) \cdot N_f = F_x r + I_w \alpha_w \quad \text{[Equation 3]}$$

where Ta denotes a torque of an axle, Id denotes a drive shaft rotational inertia, $\alpha_d$ denotes a drive shaft rotational acceleration of the drive shaft, Nf denotes a numerical ratio of the final drive, Fx denotes tractive force, r denotes the radius of a wheel, Iw denotes a wheel rotational inertia, and $\alpha_w$ denotes wheel rotational acceleration.

When the equations for the tractive force are rearranged by using the equation 1 to 3, the tractive force may be expressed as following equation 4.

$$F_x = \frac{T_e N_{tf}}{r} - [(I_e + I_t)N_{tf}^2 + I_d N_f^2 + I_w] \times \frac{\ddot{x}}{r^2} \quad \text{[Equation 4]}$$

where, Ntf denotes Nf×Nt and $\ddot{x}$ denotes acceleration of a vehicle. In this case, Nf denotes a numerical ratio of the final drive, and Nt denotes a numerical ratio of the transmission.

The equation 4, which only takes into account the acceleration of the vehicle, may be expressed as following equation 5 when considering the deceleration of the vehicle.

$$F_x = \frac{T_e N_{tf}}{r} - [(I_e + I_t)N_{tf}^2 + I_d N_f^2 + I_w] \times \frac{\ddot{x}}{r^2} + \frac{T_b}{r} \quad \text{[Equation 5]}$$

where Tb denotes a torque applied to a wheel by the hydraulic pressure corresponding to a position of a brake pedal.

Figure 4:
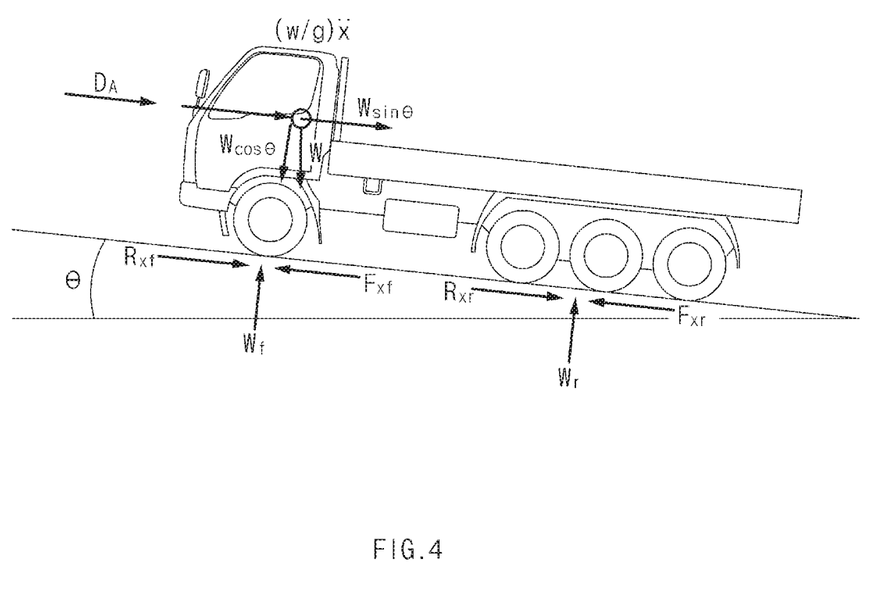
FIG. 4 is a view used for estimating the acceleration of a vehicle according to an embodiment of the present disclosure.

Meanwhile, as shown in FIG. 4, the acceleration $\ddot{x}$ of the vehicle may be calculated by subtracting an external force (rolling resistance, aerodynamic force, or gradient resistance force) from the traction force and dividing it by the mass. The acceleration of the vehicle may be expressed as following equation 6.

$$\ddot{x} = (F_x - (R_{xf} + R_{xr}) - D_A - F_s)/m \quad \text{[Equation 6]}$$

where 'm' denotes a mass of the vehicle, and the remaining variables are shown in following equation 7.

$$D_A = \tfrac{1}{2} \cdot \rho \cdot A \cdot \dot{x}^2 \cdot C_D$$

$$F_s = m \cdot g \cdot \sin(\theta)$$

$$R_{xf} = W_f \cdot C_r, R_{xr} = W_r \cdot C_r \quad \text{[Equation 7]}$$

where DA denotes an aerodynamic force, Fs denotes a gradient resistance force, Rxf denotes rolling resistance caused due to a front axle load, and Rxr denotes rolling resistance caused due to a rear axle load.

In addition, $\rho$ denotes a density of air, 'A' denotes a frontal area, $\dot{x}$ denotes a speed of a vehicle, and CD denotes a drag coefficient.

In addition, 'm' denotes a mass of a vehicle, 'g' denotes gravity acceleration, and $\theta$ denotes a road grade.

In addition, Wf denotes a load on a front axle, Wr denotes a load on a rear axle, and Cr denotes a rolling resistance coefficient. In this time, the load of the front axle and the load of the rear axle may be calculated by using the mass of the vehicle, the gravitational acceleration, the wheel base, the slope of the road, the height of the vehicle, the air force, the slope resistance, the rolling resistance coefficient, and the like.

Accordingly, the apparatus for controlling vehicle platooning mounted on the leading vehicle may estimate the acceleration of the leading vehicle based on equation 6, and may transmit the estimated acceleration to the following vehicle. In this case, the acceleration may include the acceleration and deceleration of the leading vehicle.

Next, the radar sensor 30 measures the acceleration of the preceding vehicle.

In addition, the radar sensor 30 measures the distance (the inter-vehicle distance) to the preceding vehicle.

Next, the controller 40 performs overall control such that each of the components can perform its function normally. The controller 40 may be implemented in a form of hardware or software, or may be a combination of hardware and software. Preferably, the controller 40 may be implemented with a microprocessor, but the embodiment is not limited thereto.

In addition, when the controller 40 is mounted on the leading vehicle, as described above, the controller 40 may estimate the acceleration of the leading vehicle and transmit the estimated acceleration (estimation acceleration) to the following vehicle.

In addition, when the controller 40 is mounted on the following vehicle, the controller 40 may correct the acceleration (measurement acceleration) of the preceding vehicle measured by the radar sensor 30 by using the estimated acceleration received from the leading vehicle. In this case, as one example, the controller 40 can correct the measured acceleration to the estimated acceleration based on following equation 8.

$$\ddot{x}_{des} = \frac{\ddot{x}_S \cdot \psi_S + \ddot{x}_P \cdot \psi_P}{\psi_S + \psi_P} \quad \text{[Equation 8]}$$

where $\ddot{x}_{des}$ denotes the corrected result (hereinafter, referred to as correction acceleration), $\ddot{x}_S$ denotes the measured acceleration, $\ddot{x}_P$ denotes the estimated acceleration, $\psi_S$ denotes the measured weight, and $\psi_P$ denotes the estimated weight.

Figure 5:
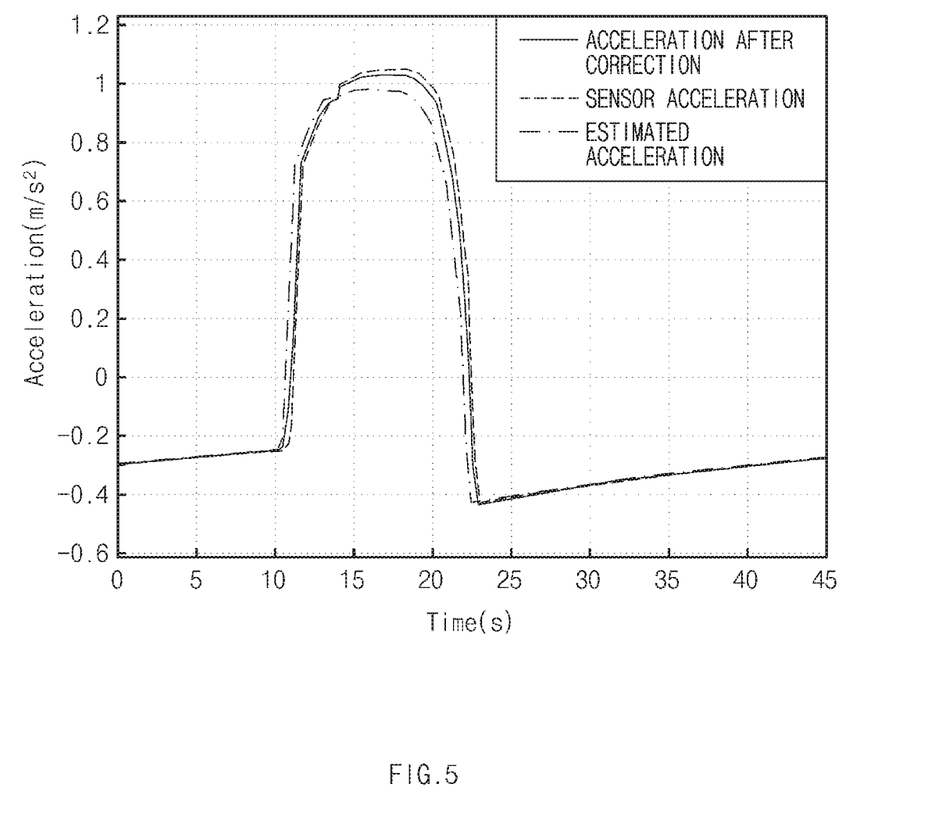
FIG. 5 is a view illustrating a result of correcting measured acceleration in a first mode by a controller according to an embodiment of the present disclosure.
Figure 6:
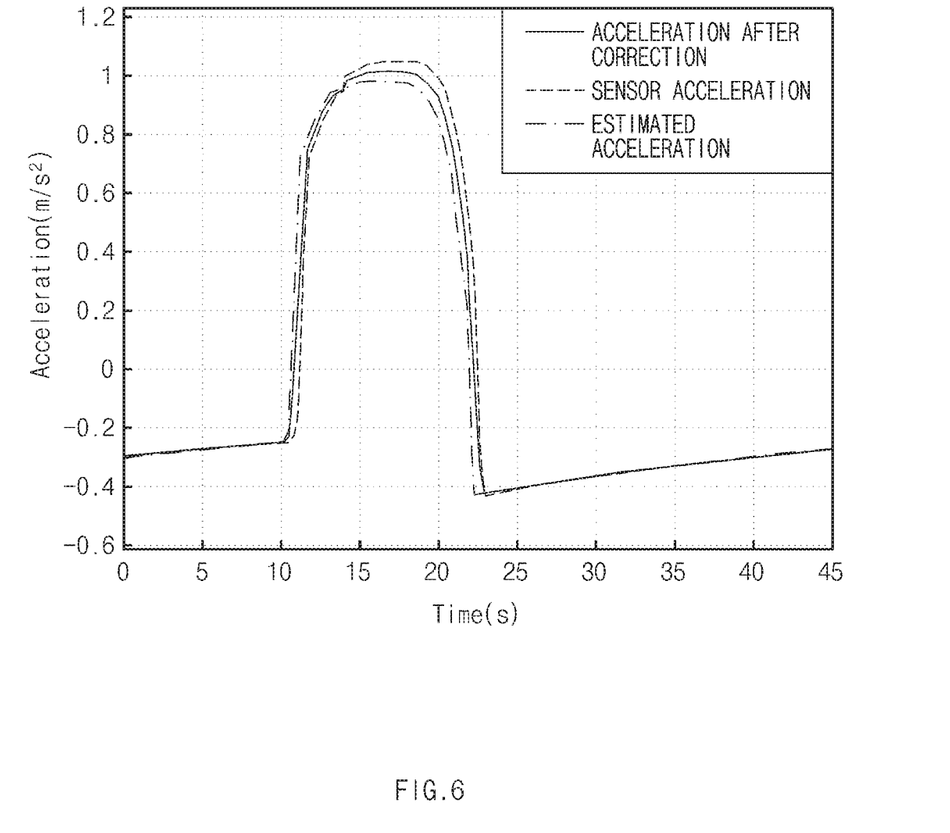
FIG. 6 is a view illustrating a result of correcting measured acceleration in a second mode by a controller according to an embodiment of the present disclosure.
Figure 7:
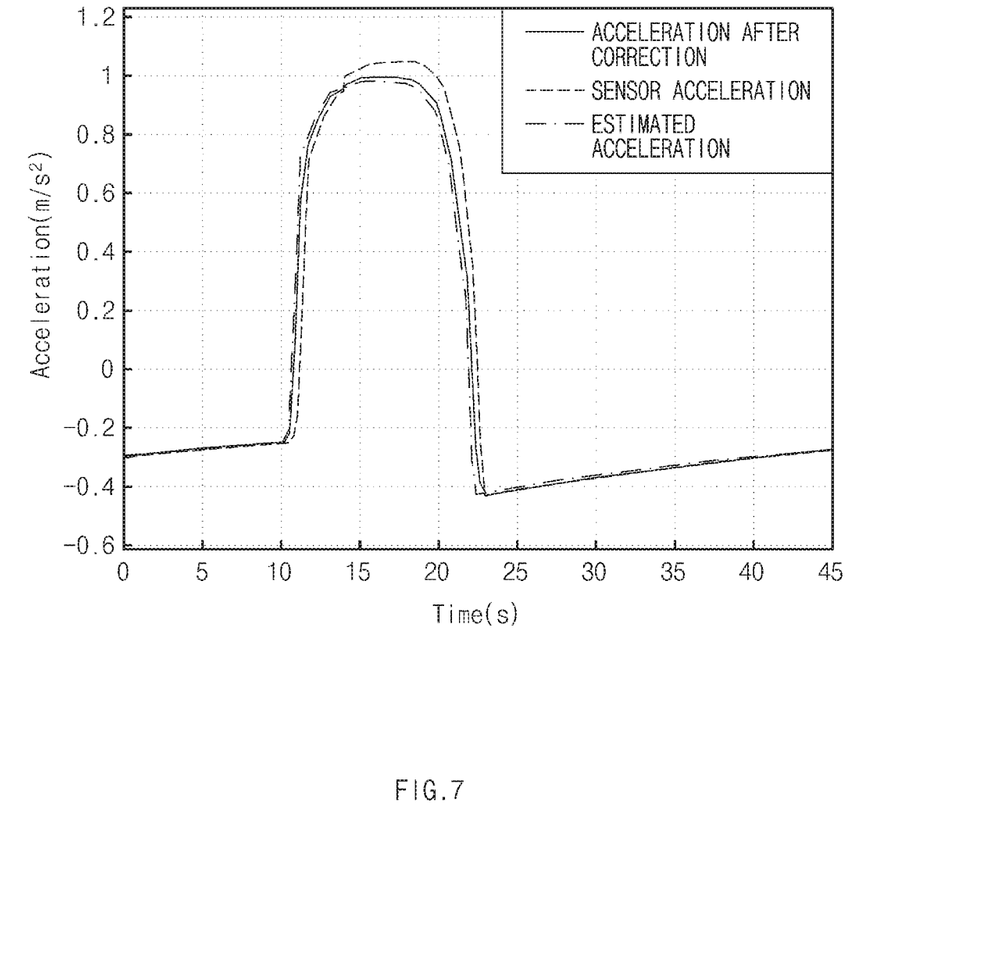
FIG. 7 is a view illustrating a result of correcting measured acceleration in a third mode by a controller according to an embodiment of the present disclosure.

Hereinafter, a method of giving the measured weight and the estimated weight in the process of calculating the correction acceleration by the controller 40 will be described with reference to FIGS. 5 to 7.

First, the controller 40 calculates an error of the inter-vehicle distance. That is, the controller 40 subtracts the reference distance from the inter-vehicle distance measured by the radar sensor 30 to calculate the error E of the inter-vehicle distance.

Thereafter, the controller 40 gives the measured weight and the estimated weight based on the following Table 1

TABLE 1

|  | Mode 1 | Mode 2 | Mode 3 |
| --- | --- | --- | --- |
| Inter-vehicle distance error (m) | $\|E\| \leq 0.5$ | $0.5 < \|E\| \leq 1$ | $1 < \|E\|$ |
| Measured weight ($\Psi_S$) | 3 | 2 | 1 |
| Estimated weight ($\Psi_P$) | 1 | 2 | 3 |

For example, when the reference distance is 15 m and the current inter-vehicle distance is 14.5 m or more and 15.5 m or less, since it corresponds to mode 1, '3' is assigned as the measured weight and '1' is assigned as the estimated weight. Since this is a case where the error is very small and it is effective to control the vehicle platooning based on the measured acceleration, it is preferable that the measurement acceleration has a larger weight than the estimation acceleration. The corrected acceleration in mode 1 is shown in FIG. 5.

When the current inter-vehicle distance is 14 m or more and less than 14.5 m and the current inter-vehicle distance is more than 15.5 m and less than 16 m, since it corresponds to mode 2, the measured weight and the estimated weight are set to '2', respectively. In the case where the error of the inter-vehicle distance is medium, it is preferable to give the same weight to the measurement acceleration and the estimation acceleration. The corrected acceleration in mode 2 is shown in FIG. 6.

In addition, when the current inter-vehicle distance is less than 14 m or more than 16 m, since it corresponds to mode 3, '1' is assigned as the measured weight and '3' is assigned as the estimated weight. Since this is a case where the error of the inter-vehicle distance is large, it is preferable that the estimation acceleration is given more weight than the measurement acceleration so that the APS value or the BPS value may be quickly reflected. The corrected acceleration in mode 3 is shown in FIG. 7.

Figure 8:
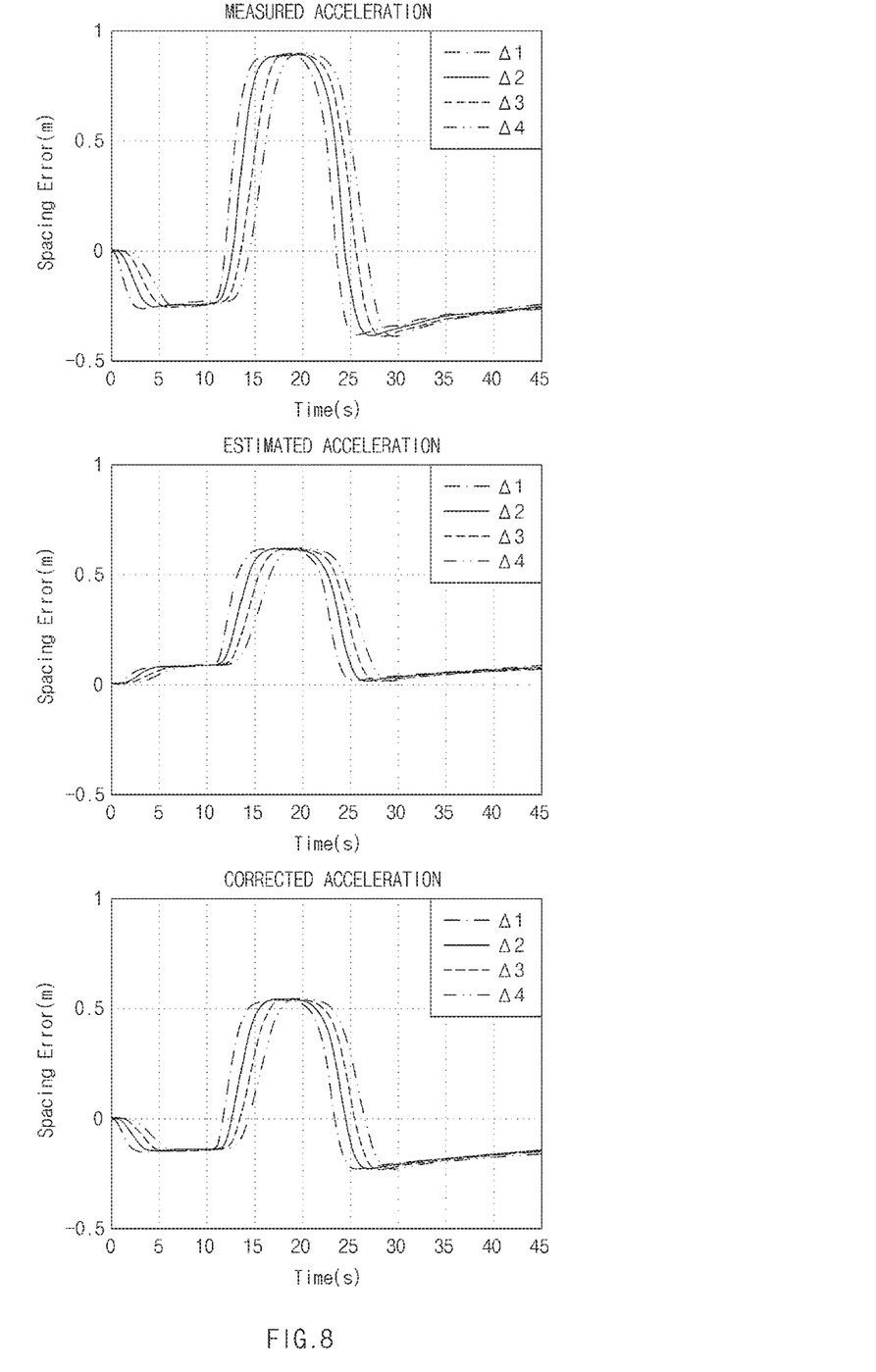
FIG. 8 is a view illustrating a first performance analysis of an apparatus for controlling vehicle platooning according to an embodiment of the present disclosure.

FIG. 8 is a view illustrating a first performance analysis of an apparatus for controlling vehicle platooning according to an embodiment of the present disclosure. FIG. 8 illustrates performance when the BPS value is zero (the brake is in a non-operating state).

As shown in FIG. 8, in case of controlling vehicle platooning by using the measurement acceleration, the maximum error of the inter-vehicle distance is +0.903 m, and in case of controlling vehicle platooning by using the estimation acceleration, the maximum error of the inter-vehicle distance is +0.615 m. In addition, in case of controlling vehicle platooning by using the corrected acceleration, the maximum error of the inter-vehicle distance is +0.552 m. In this case, the plus '+' means a state in which the inter-vehicle distance is longer than the reference distance (the inter-vehicle distance exceeds the reference distance).

In FIG. 8, reference numerals Δ1, Δ2, Δ3 and Δ4 denote vehicle 1, vehicle 2, vehicle 3, and vehicle 4 in the platoon.

Thus, it may be understood that the error (fluctuation range) of the inter-vehicle distance is the smallest when controlling vehicle platooning using the corrected acceleration according to the embodiment of the present disclosure. This may ensure the stability of the vehicle platooning and may improve the fuel efficiency of a vehicle compared to other schemes.

Figure 9:
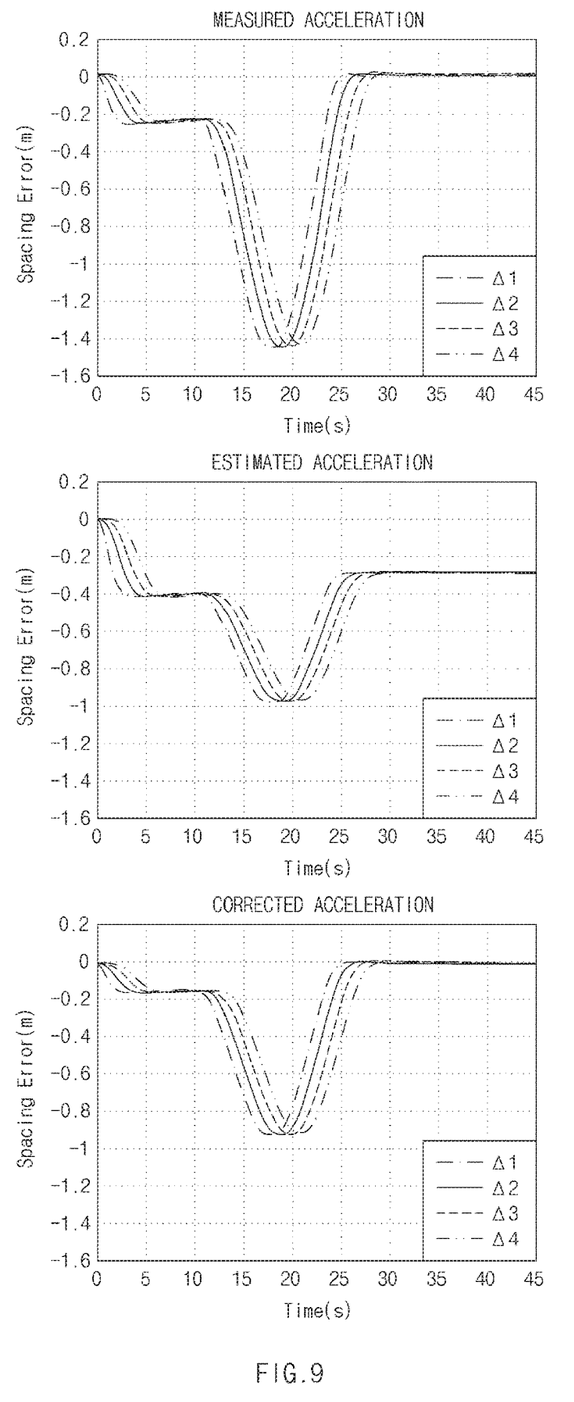
FIG. 9 is a view illustrating a second performance analysis of an apparatus for controlling vehicle platooning according to an embodiment of the present disclosure.

FIG. 9 is a view illustrating a second performance analysis of an apparatus for controlling vehicle platooning according to an embodiment of the present disclosure. FIG. 9 illustrates performance when the BPS value is not zero (the brake is in an operating state).

As shown in FIG. 9, in case of controlling vehicle platooning by using the measurement acceleration, the maximum error of the inter-vehicle distance is −1.458 m, and in case of controlling vehicle platooning by using the estimation acceleration, the maximum error of the inter-vehicle distance is −0.971 m. In addition, in case of controlling vehicle platooning by using the corrected acceleration, the maximum error of the inter-vehicle distance is −0.875 m. In this case, the negative '−' means a state in which the inter-vehicle distance is smaller than the reference distance (the inter-vehicle distance is less than the reference distance).

In FIG. 9, reference numerals Δ1, Δ2, Δ3 and Δ4 denote vehicle 1, vehicle 2, vehicle 3, and vehicle 4 in the platoon Thus, it may be understood that the error (fluctuation range) of the inter-vehicle distance is the smallest when controlling vehicle platooning using the corrected acceleration according to the embodiment of the present disclosure. This may ensure the stability of the vehicle platooning and may improve the fuel efficiency of a vehicle compared to other schemes.

Figure 10:
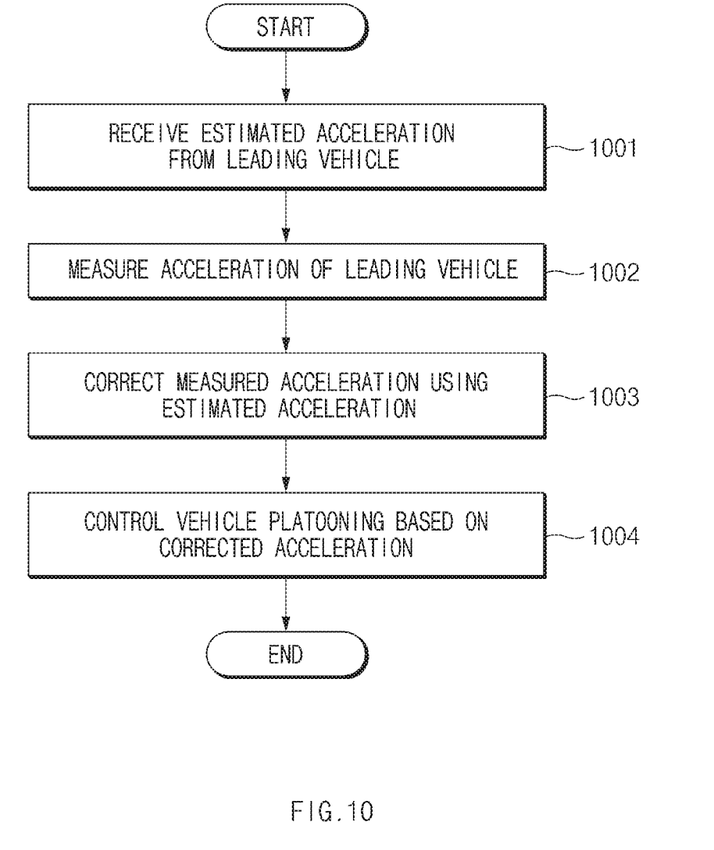
FIG. 10 is a flowchart illustrating a method of controlling vehicle platooning according to an embodiment of the present disclosure.

FIG. 10 is a flowchart illustrating a method of controlling vehicle platooning according to an embodiment of the present disclosure.

In operation 1001, the V2V communication device 20 receives the estimated acceleration from the leading vehicle.

In operation 1002, the acceleration sensor 30 measures the acceleration of the preceding vehicle.

Then, in operation 1003, the controller 40 corrects the acceleration (hereinafter, referred to as a measurement acceleration) of the preceding vehicle measured by the acceleration sensor 30 by using the estimated acceleration received by the V2V communication device 20.

Then, in operation 1004, the controller 40 controls the vehicle platooning based on the corrected acceleration.

Through this process, the fluctuation range of the inter-vehicle distance may be minimized and the fuel consumption of the following vehicle may be improved.

Figure 11:
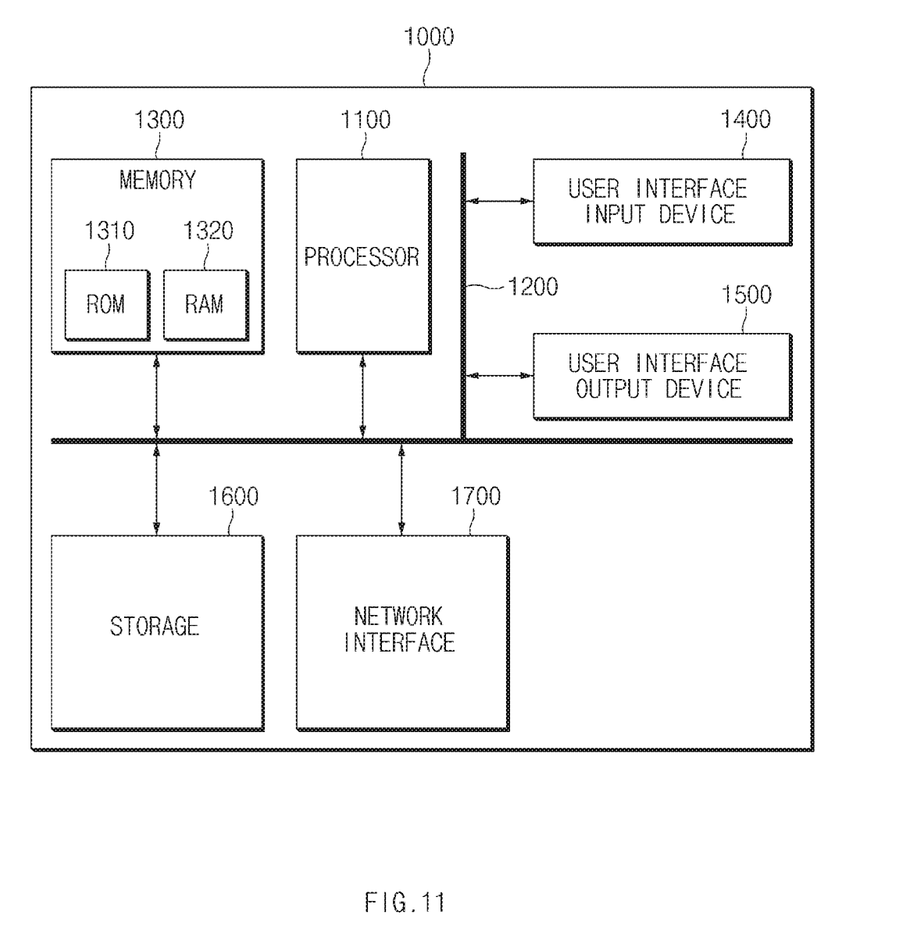
FIG. 11 is a block diagram illustrating a computer system for executing a method of controlling vehicle platooning according to an embodiment of the present disclosure.

FIG. 11 is a block diagram illustrating a computer system for executing a method of controlling vehicle platooning according to an embodiment of the present disclosure.

Referring to FIG. 11, the method of controlling vehicle platooning according to an embodiment of the present disclosure may be implemented with a computer system. A computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the embodiments of the present disclosure, the apparatus for controlling vehicle platooning and the method thereof may minimize the fluctuation range by correcting acceleration (hereinafter, referred to as measurement acceleration) of the leading vehicle measured by the following vehicle based on the acceleration (hereinafter, referred to as estimation acceleration) of the leading vehicle estimated by using the accelerator position sensor (APS) value and the brake position sensor (BPS) value of the leading vehicle, and by controlling the platooning of the following vehicle by using the corrected acceleration (hereinafter, referred to as correction acceleration).

In addition, according to the embodiments of the present disclosure, the apparatus for controlling vehicle platooning and the method thereof may improve the fuel efficiency of the following vehicle by correcting the acceleration (hereinafter, referred to as measurement acceleration) of the leading vehicle measured by the following vehicle based on the acceleration (hereinafter, referred to as estimation acceleration) of the leading vehicle estimated by using the accelerator position sensor (APS) value and the brake position sensor (BPS) value of the leading vehicle, and by controlling the platooning of the following vehicle by using the corrected acceleration (hereinafter, referred to as correction acceleration).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling vehicle platooning, the apparatus comprising:
a communication device configured to receive estimated acceleration from a leading vehicle;
a radar sensor configured to measure acceleration of a preceding vehicle; and
a controller configured to calculate a corrected acceleration by using the estimated acceleration received from the leading vehicle and the measured acceleration of the preceding vehicle and to control the vehicle platooning based on the corrected acceleration;
wherein the controller is configured to give weights to the estimated acceleration and the measured acceleration, respectively, to calculate the corrected acceleration; and
wherein the weights given to the estimated acceleration and the measured acceleration are based upon an error of an inter-vehicle distance.

2. The apparatus of claim 1, wherein the controller is configured to divide a sum of a result of multiplying the estimated acceleration by an estimated weight and a result of multiplying the measured acceleration by a measured weight by a sum of the estimated weight and the measured weight, thereby calculating the corrected acceleration.

3. The apparatus of claim 2, wherein the controller is configured to give a greater weight to the measured acceleration than the estimated acceleration when an error of an inter-vehicle distance is included in a first section.

4. The apparatus of claim 3, wherein the estimated acceleration is estimated based on an engine torque corresponding to an accelerator position sensor (APS) value and an engine revolution per minute (RPM).

5. The apparatus of claim 2, wherein the controller is configured to give a same weight to the estimated acceleration and the measured acceleration when an error of an inter-vehicle distance is included in a second section.

6. The apparatus of claim 5, wherein the estimated acceleration is estimated based on an engine torque corresponding to an accelerator position sensor (APS) value and an engine revolution per minute (RPM).

7. The apparatus of claim 2, wherein the controller is configured to give a greater weight to the estimated acceleration than the measured acceleration when an error of an inter-vehicle distance is included in a third section.

8. The apparatus of claim 7, wherein the estimated acceleration is estimated based on an engine torque corresponding to an accelerator position sensor (APS) value and an engine revolution per minute (RPM).

9. An apparatus for controlling vehicle platooning, the apparatus comprising:
a communication device configured to receive estimated acceleration from a leading vehicle, wherein the estimated acceleration is estimated based on an engine torque corresponding to an accelerator position sensor (APS) value and an engine revolution per minute (RPM);
a radar sensor configured to measure acceleration of a preceding vehicle; and
a controller configured to calculate a corrected acceleration by using the estimated acceleration received from the leading vehicle and the measured acceleration of the preceding vehicle and to control the vehicle platooning based on the corrected acceleration.

10. The apparatus of claim 9, wherein the estimated acceleration is estimated based on the engine torque corresponding to the accelerator position sensor (APS) value and the engine revolution per minute (RPM) and a torque applied to a wheel by a hydraulic pressure corresponding to a brake position sensor (BPS) value.

11. A method of controlling vehicle platooning, the method comprising:
receiving estimated acceleration from a leading vehicle;
measuring, by a radar sensor, acceleration of a preceding vehicle;
calculating corrected acceleration by using the estimated acceleration received and the measured acceleration of the preceding vehicle; and
controlling the vehicle platooning based on the corrected acceleration calculated;
wherein calculating the corrected acceleration comprises giving weights to the estimated acceleration and the measured acceleration, respectively, to calculate the corrected acceleration; and
wherein the weights given to the estimated acceleration and the measured acceleration are based upon an error of an inter-vehicle distance.

12. The method of claim 11, wherein calculating the corrected acceleration comprises dividing a sum of a result of multiplying the estimated acceleration by an estimated weight and a result of multiplying the measured acceleration by a measured weight by a sum of the estimated weight and the measured weight, thereby calculating the corrected acceleration.

13. The method of claim 12, wherein calculating the corrected acceleration comprises giving a greater weight to the measured acceleration than the estimated acceleration when an error of an inter-vehicle distance is included in a first section.

14. The method of claim 12, wherein calculating the corrected acceleration comprises giving a same weight to the estimated acceleration and the measured acceleration when an error of an inter-vehicle distance is included in a second section.

15. The method of claim 14, wherein the estimated acceleration is estimated based on an engine torque corresponding to an accelerator position sensor (APS) value and an engine revolution per minute (RPM).

16. The method of claim 12, wherein calculating the corrected acceleration comprises giving a greater weight to the estimated acceleration than the measured acceleration when an error of an inter-vehicle distance is included in a third section.

17. The method of claim 16, wherein the estimated acceleration is estimated based on an engine torque corresponding to an accelerator position sensor (APS) value and an engine revolution per minute (RPM).

18. The method of claim 11, wherein the estimated acceleration is estimated based on an engine torque corresponding to an accelerator position sensor (APS) value and an engine revolution per minute (RPM).

19. The method of claim 18, wherein the estimated acceleration is estimated based on the engine torque corresponding to the accelerator position sensor (APS) value and the engine revolution per minute (RPM) and a torque applied to a wheel by a hydraulic pressure corresponding to a brake position sensor (BPS) value.

20. The method of claim 13, wherein the estimated acceleration is estimated based on an engine torque corresponding to an accelerator position sensor (APS) value and an engine revolution per minute (RPM).

* * * * *